L. A. GRIFFIN.
METHOD OF MAKING CAST IRON PIPE SECTIONS.
APPLICATION FILED AUG. 9, 1919.
1,416,460. Patented May 16, 1922.
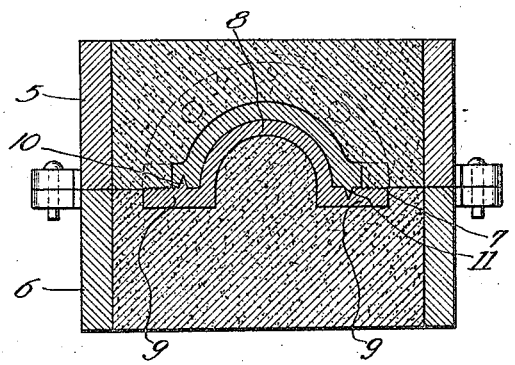
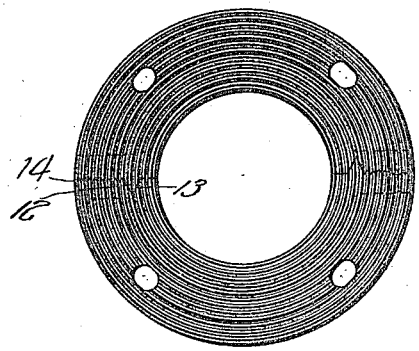
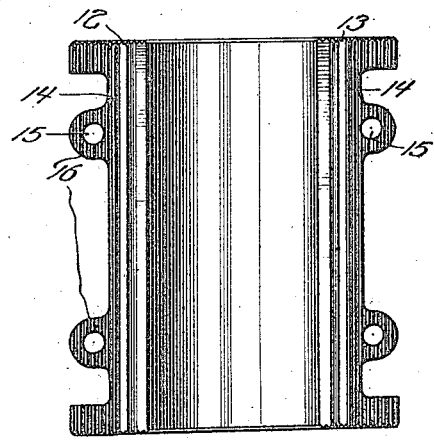
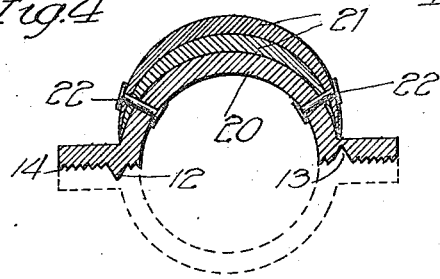
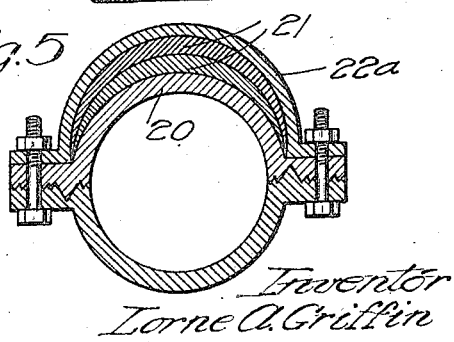
Inventor
Lorne A. Griffin

UNITED STATES PATENT OFFICE.

LORNE A. GRIFFIN, OF EVANSTON, ILLINOIS, ASSIGNOR TO AMERICAN STEAM CONVEYOR CORPORATION, OF CHICAGO, ILLINOIS, A CORPORATION OF NEW YORK.

METHOD OF MAKING CAST-IRON PIPE SECTIONS.

1,416,460.   Specification of Letters Patent.   Patented May 16, 1922.

Application filed August 9, 1919. Serial No. 316,414.

*To all whom it may concern:*

Be it known that I, LORNE A. GRIFFIN, a citizen of the United States, residing at Evanston, in the county of Cook and State of Illinois, have invented a certain new and useful Improvement in Methods of Making Cast-Iron Pipe Sections, of which the following is a full, clear, concise, and exact description, reference being had to the accompanying drawings, forming a part of this specification.

My invention relates to improvements in methods of making cast iron pipe sections, and is particularly concerned with methods of making cast iron pipe sections designed to be used for making pipe conveyor systems for conveying ashes, sand, grain and other materials having a tendency to abrade the inner surfaces of the pipe sections forming the conveyor conduit.

Heretofore attempts have been made to make pipe sections for forming pipe conveyor systems of cast iron, but it has been found that unless the inner surface of the pipe sections is chilled, the pipe sections are quickly worn out by the abrasive action of the materials conveyed therethrough. Attempts have been made to chill the inner surfaces of the pipe sections, in order to make them more successfully withstand this abrasive action, but considerable difficulty has been experienced in chilling these sections by reason of the fact that the contraction induced by the chilling process has caused the pipe to adhere to the chills employed for this purpose, and it has been difficult to collapse the chills to withdraw them from the pipe sections.

The object of my invention is to provide a process by means of which a chilled cast iron pipe section can be easily, quickly and economically manufactured.

Other objects will definitely appear as this description progresses, reference being had to the accompanying drawings, in which—

Figure 1 is a transverse section through a mold employed for carrying out a portion of my process;

Figure 2 is a semi-cylindrical pipe section formed by my improved process;

Figure 3 is an end view of a completed pipe section formed in accordance with my invention, and Figures 4 and 5 are sectional views illustrating conduits constructed in accordance with my invention, one of the semi-cylindrical conduit elements in each case being reenforced in accordance with a further feature of my invention.

In carrying out my invention, I preferably provide a two part mold comprising a cope 5 and a drag 6. The drag 6 supports a cast iron chill 7, comprising the central substantially semi-cylindrical portion 8 having extending from each side thereof the longitudinally extending flanges 9. One of the flanges 9 is provided with a V-shaped projection 10 and the other with a V-shaped groove 11 extending longitudinally thereof. The pattern for the semi-cylindrical pipe section is placed upon the chill, cope 5 is assembled upon the drag 6 and filled in a well known manner, the cope is then removed to allow the pattern to be removed from the chill, and then the cope is again placed upon the drag so as to form the completed mold for the semi-cylindrical section. The molten metal is then poured into the mold, the metal forming the inner surface of the semi-cylindrical pipe section coming directly into contact with the chill 7, whereupon it is quickly cooled, forming a dense and very hard surface.

While the casting thus formed is still red hot, it is stripped from the chill 7 and allowed to slowly cool in the sand of the mold. After it has become thoroughly cooled, the rib 12 formed by the groove 11 and the groove 13, formed by the rib 10 of the chill are machined, and at the same time those portions of the edges of the semi-cylindrical pipe sections extending outwardly beyond rib 12 and the groove 13 and the faces of the end flanges as well are preferably scored or grooved as indicated at 14 to co-operate with the cement and asbestos grouting or other packing material to form a complete pipe section. Two of these semi-cylindrical pipe sections are assembled as indicated in Figure 3, and held together by means of bolts (not shown) passing through the openings 15 in the lugs 16 at each side of the semi-cylindrical sections.

By my above mentioned process, I can form cast iron pipe sections, having chilled inner surfaces, very much more expeditiously and economically than it has heretofore been possible to form such pipe sections.

I have found that as a practical matter, it is not feasible to make chilled iron pipe sections of great thickness. Therefore, in forming any portion of a conduit which it is desirable shall be of great cross-section in order to withstand exceptional wear, I prefer to employ the arrangement shown in Figure 4. The chilled cast iron pipe section 20 illustrated in this figure is made by the process hereinbefore described. Any pipe section may be supplemented or reinforced by one or more sections 21—21 which are disposed one over the other and lie around the section 20. The sections 21—21 are preferably of chilled cast iron, cast by a method similar to the one herein described, it being understood that in casting the chilled iron sections 21, the conformation of the chill and patterns employed would have to be made to suit the requirements of the job in hand. The sections 21—21 may be retained in position by rivets, as indicated at 22 in Figure 4. When rivets are used it is desirable that the same shall be located near the lateral edges of sections 21—21 or, in other words, away from that portion of the conduit where greatest wear usually occurs.

If desired, the supplemental pipe sections 21—21 may be held in position by bands, one of which is illustrated at 22ª in Figure 5. The bands are conveniently secured by the bolts which are employed for fastening the semi-cylindrical pipe sections 20 together, but I contemplate securing the bands in any other suitable and expedient manner.

While I have described one method of making a chilled iron pipe section embodying my invention, it is to be clearly understood that my invention is not limited to the details described, but is capable of other adaptations and modifications within the scope of the appended claims.

Having thus described my invention, what I claim is:—

1. The method which consists in casting a conduit member having a substantially cylindrical outer surface, chilling the same, casting a wear sleeve having a concave surface arranged to fit the outer surface of said conduit member, applying the concave surface of said wear sleeve to the outer cylindrical surface of said conduit member and securing said sleeve to said conduit member.

2. The method which consists in casting a conduit member having a substantially cylindrical outer surface, chilling the same, casting a wear sleeve having a concave surface arranged to fit the outer surface of said conduit member, applying the concave surface of said wear sleeve to the outer cylindrical surface of said conduit member and securing said sleeve to said conduit member by rivets located immediately adjacent the lateral edges of said wear sleeve.

3. A cast iron pipe section comprising semi-cylindrical sections secured at their opposing edges and semi-cylindrical wear sleeves secured upon the outside thereof by means of rivets, said rivets passing through said semi-cylindrical sections and said wear sleeves.

4. A cast iron pipe section comprising chilled semi-cylindrical sections and chilled wear sleeves therefor, said wear sleeves having a concave surface to fit the outer surface of said semi-cylindrical sections.

5. A cast iron pipe section comprising semi-cylindrical sections and chilled semi-cylindrical wear sleeves, secured thereupon by rivets.

6. A cast iron pipe section comprising semi-cylindrical sections and wear sleeves secured upon the outside thereof.

7. A cast iron pipe section comprising semi-cyclindrical sections, flanges thereon for securing the sections together, wear sleeves on said semi-cylindrical sections, and bands for holding said wear sleeves in position.

In witness whereof, I hereunto subscribe my name this 6th day of August, 1919.

LORNE A. GRIFFIN.

Witnesses:
MARY A. COOK,
NORINE BIDWELL.